US011966562B2

(12) United States Patent
Akrabi et al.

(10) Patent No.: US 11,966,562 B2
(45) Date of Patent: Apr. 23, 2024

(54) GENERATING NATURAL LANGUAGES INTERFACE FROM GRAPHIC USER INTERFACES

(71) Applicant: International Business Machines Corporation, Armonk, NY (US)

(72) Inventors: Offer Akrabi, Lehavot Habashan (IL); Erez Lev Meir Bilgory, Kiryat Tivon (IL); Sami Sobhe Marreed, Kafr Kanna (IL); Alessandro Donatelli, Rome (IT); Asaf Adi, Kiryat Ata (IL); Nir Mashkif, Geva Carmel (IL)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/198,951

(22) Filed: Mar. 11, 2021

(65) Prior Publication Data

US 2022/0291788 A1 Sep. 15, 2022

(51) Int. Cl.
*G06F 3/0482* (2013.01)
*G06F 3/04812* (2022.01)
*G06F 3/16* (2006.01)
*G06F 40/35* (2020.01)

(52) U.S. Cl.
CPC ........ *G06F 3/0482* (2013.01); *G06F 3/04812* (2013.01); *G06F 3/167* (2013.01); *G06F 40/35* (2020.01)

(58) Field of Classification Search
CPC .... G06F 3/0482; G06F 3/04812; G06F 3/167; G06F 40/35; G06F 40/30
See application file for complete search history.

(56) References Cited

U.S. PATENT DOCUMENTS

| | | | |
|---|---|---|---|
| 8,532,978 B1 | 9/2013 | Turner | |
| 10,079,016 B2 | 9/2018 | Jacobs, II | |
| 10,360,304 B1 | 7/2019 | Alvarez | |
| 2015/0073798 A1* | 3/2015 | Karov | G06F 16/36 704/243 |
| 2017/0308571 A1 | 10/2017 | McCurley | |
| 2017/0322866 A1* | 11/2017 | Moran | G06F 11/0769 |

(Continued)

FOREIGN PATENT DOCUMENTS

| | | |
|---|---|---|
| CN | 110162297 A | 8/2019 |
| WO | 2022189925 A1 | 9/2022 |

OTHER PUBLICATIONS

International Search Report and Written Opinion, International Application No. PCT/IB2022/051964, International Filing Date Mar. 6, 2022.

(Continued)

*Primary Examiner* — Andrey Belousov
(74) *Attorney, Agent, or Firm* — Monchai Chuaychoo

(57) ABSTRACT

An approach for automatically generate the Natural Language Interface (NLI) directly from the Graphical User Interface (GUI) code is disclosed. The approach leverages the use of mapping between GUI components to pre-defined NLI components in order to generate the necessary NLI components (e.g., intent example, entities, etc.) from the GUI code representation. The approach can leverage pre-defined patterns in order to generate these intent examples for each kind of NLI components. The created NLI dialog can be used simultaneously with the GUI or as a standalone feature.

20 Claims, 8 Drawing Sheets

(56) References Cited

U.S. PATENT DOCUMENTS

| | | |
|---|---|---|
| 2019/0132264 A1* | 5/2019 | Jafar Ali ............... G06F 40/295 |
| 2020/0081907 A1 | 3/2020 | Branavan |
| 2020/0089700 A1 | 3/2020 | Ericson |
| 2020/0142964 A1 | 5/2020 | Rodriguez Bravo |
| 2021/0006517 A1 | 1/2021 | Nahum |

OTHER PUBLICATIONS

Chong et al., "A Framework for Creating Natural Language User Interfaces for Action-Based Applications", arXiv:cs/0412065v1 [cs.CL], Dec. 17, 2004, 25 pages.

* cited by examiner

Example app – Main screen

Fields:

1. Site Id – input
2. Work order id – input

Fixed data:
1. Username

Actions:
1. Logout
2. Navigate to configuration screen
3. Start Inspection
4. Scan PTT

Example App – Configuration screen

Fields:
1. Inspection form – dropdown
2. Local STT – toggle
3. TTS Rate – seek bar
4. Audio output – dropdown Fixed data:
1. App version Actions:
1. Logout
2. Save
3. Privacy policy

FIG. 2B

Example conversation

1. U: "I want to configure the TTS speed"

2. A: "Ok, what speaking speed would you like?"

3. U: "set it to 1.5"

4. A: "Noted, speaking speed set to 1.5"

Example Logic

1. NLU maps the utterance to 'report' intent with 'TTS speed' entity. Now the assistant knows the user wants to enter a value into the 'TTS range' field.
   TTS range was a seekbar in the GUI and was mapped to a numeric value field with range 2. Assistant responds, asking for a value, expecting a numerical value.

3. Assistant validates (numeric value and in range) the input and stores it.

4. Assistant notifies the user the action was done successfully

FIG. 2D

Example conversation

1. U: "What forms do I have?"

2. A: "Demo and test form are available"

3. U: "select demo form"

4. A: "Noted, selected demo form"

5. U: "start inspection"

Example Logic

1. NLU maps the utterance to a 'query' intent with 'forms' entity. The assistant knows the user wants to query the value of the 'inspection forms' field. Inspections forms was mapped into a single choice field, which has a set of allowed values.

2. Assistant responds, stating all possible values.

3. NLU identifies the 'demo form' intent from the training done based on the examples from the GUI and the assistant stores the value.

4. Assistant notifies the user the action was done successfully

5. NLU maps 'start inspection' to the 'start inspection' intent which was mapped to the action (button) for stating the inspection

FIG. 2E

GENERATING NATURAL LANGUAGES INTERFACE FROM GRAPHIC USER INTERFACES

BACKGROUND

The present invention relates generally to GUI (Graphical User Interface), and more particularly to generating natural language interface from GUIs.

The main way for users to currently interact with applications is through a GUI (Graphical User Interface). Although it is becoming more and more common to try to build applications that, also work with a NLI (Natural Language Interface). There are several apps and web pages used today could be much easier to use in some cases if these apps and web pages had an NLI. For example, working with a grocery-shopping checklist while at the grocery store.

Building the NLI from scratch, even with the GUI is already built, is a lot of work and requires knowledge in conversation design that is not common among application developers. This means that companies or developers that would like to add a NLI to their app would need to invest a lot of time into researching and implementing of this interface. In addition, they would have to keep their two interfaces synchronized, i.e. a change in one interface would probably require a change in the other.

SUMMARY

Aspects of the present invention disclose a computer-implemented method, a computer system and computer program product for creating a NL (Natural Language) dialogue from GUI (Graphical User Interface) code. The computer implemented method may be implemented by one or more computer processors and may include receiving GUI code representation of an application; mapping the GUI code representation to one or more NLI components; determining a pre-define intent patterns based on the one more NLI components; creating one or more intent examples based on the predefine intent patterns; creating one or more entities based on the one or more intent examples; mapping action function to a backend operation of the one or more NLI components; and generating a NL (natural language) dialogue based on the one or more intent examples, the one or more entities, mapped action function and pre-defined conversation component.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 1 includes an expanded view of natural language component 111 which features several subcomponents contained within, in accordance with an embodiment of the present invention;

FIG. 2B is screenshot of a configuration screen of a sample application (from FIG. 2A), in accordance with an embodiment of the present invention;

FIG. 2D is a sample of conversations and the corresponding logic, in accordance with an embodiment of the present invention;

FIG. 2E is another sample of conversations and the corresponding logic, in accordance with an embodiment of the present invention;

DETAILED DESCRIPTION

Figure 1:
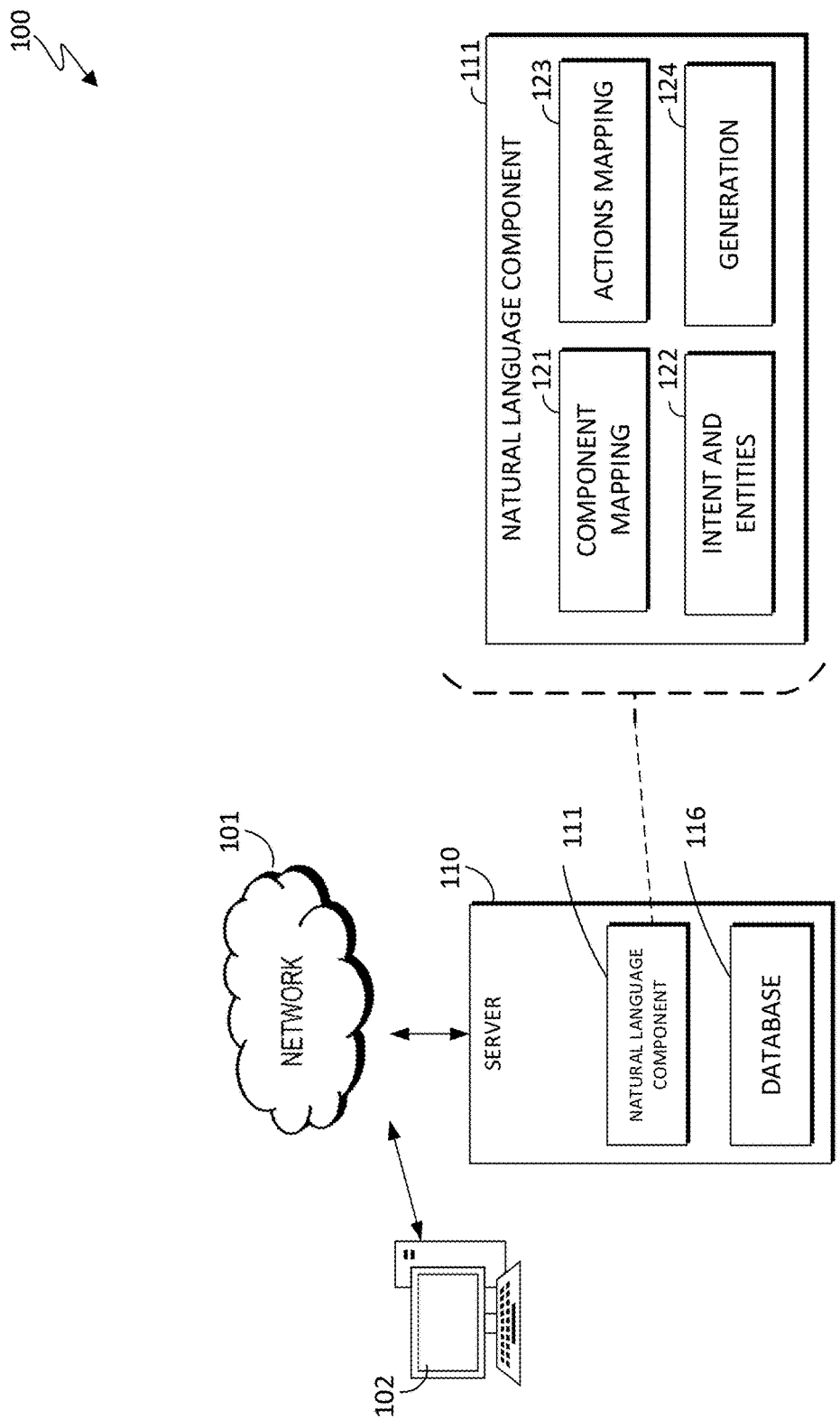
FIG. 1 is a functional block diagram illustrating natural language environment, designated as 100, in accordance with an embodiment of the present invention.

Embodiments of the present invention recognizes the deficiencies in the current state of art and provides an approach, to automatically generate the NLI (Natural Language Interface) directly from the GUI (Graphical User Interface) code. Embodiments leverages the use of mapping between GUI components to pre-defined NLI components in order to generate the necessary e.g. single choice, multiple choice, free text, etc.) and intent and entity examples. The approach can leverage pre-defined patterns in order to generate intent examples for each predefined intents of NLI components. The NLI will use the same operations and examples. For example, the pre-defined intents (i.e., "report" intent) exist as part of the pre-defined NLI components, the pre-defined patterns are used to generate training examples for these intents (i.e., "I would like to report that {X} is {Y}" where X and Y will be replaced by actual values extracted from the GUI).

The approach can be briefly summarized by the following steps: i) mapping the GUI components to the corresponding NLI components (i.e., drop down selection is mapped to a single choice input NLI component), ii) utilizing predefined patterns to create intent and entity examples for each kind of NLI components, iii) mapping action components, and iv) generating a natural language dialog representation of the application.

Intents, entities and actions can be described further. Every NLI component has a pre-defined "intents" which corresponds to it and pre-defined intent patterns. Intents are based on the names and IDs (identifications) of the GUI components in the code, can be used as a basis for creating intent examples from pre-defined patterns. Entities are based on the components parsed from the GUI code representations, entities can use some of the GUI component's names and IDs as entities and synonyms. Actions are mapping between calls to actions in the GUI code representation (i.e., button's onClick callback function) to NL (Natural Language) component's backend operations as part of the above mentioned mapping. Additionally, mapping can occur while also looking for any restrictions on the action (i.e., a dropdown component could have pre-defined allowed values) that will need to be taken into account in the NLI. It is noted that the created Natural Language dialog can be used simultaneously with the GUI or as a standalone feature.

Other embodiments of the present invention can address the deficiencies in the current art and provide the following advantages: i) creating a whole different interface without changing the existing GUI at all, ii) automatically creating a natural language interface from the graphical user interface, iii) leveraging different types of GUI and NLI components and iv) leveraging training different intents and entities and v) the NLI will automatically find the GUI along with known conversational component to create the new interface.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a natural language environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Natural language environment 100 includes product network 101, computing device 102 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, computing device 102 and other computing devices (not shown) within natural language environment 100. It is noted that other computing devices can include, but is not limited to, computing device 102 and any electromechanical devices capable of carrying out a series of computing instructions.

Computing device 102 can include a cluster of end-user machines and software programming platforms. Computing device 102 provides a capability for users (i.e., programmers) to create NLI dialogue from GUI components.

Server 110 and computing device 102 can be a standalone computing device, a management server, a web server, a mobile computing device, or any other electronic device or computing system capable of receiving, sending, and processing data. In other embodiments, server 110 and computing device 102 can represent a server computing system utilizing multiple computers as a server system, such as in a cloud computing environment. In another embodiment, server 110 and Computing device 102 can be a laptop computer, a tablet computer, a netbook computer, a personal computer (PC), a desktop computer, a personal digital assistant (PDA), a smart phone, or any other programmable electronic device capable of communicating other computing devices (not shown) within natural language environment 100 via network 101. In another embodiment, server 110 and Computing device 102 represents a computing system utilizing clustered computers and components (e.g., database server computers, application server computers, etc.) that act as a single pool of seamless resources when accessed within natural language environment 100.

Embodiment of the present invention can reside on server 110. Server 110 includes natural language component 111 and database 116. Other embodiment of the present invention can reside on computing device 102.

Natural language component 111 provides the capability of generating the necessary NLI components (e.g., intents, entities, etc.) from the GUI code representation. Natural language component 111 can parse out (by leveraging machine learning) the GUI code representation and extract all relevant information for the NLI. After the extraction, natural language component 111 can use the predefine patterns (by leveraging machine learning) in order to generate intents examples (additionally, entities based on intent examples) for each kind of NLI components. Based on the generated intents, entities and other components, natural language component 111 can create (by leveraging machine learning) NLI dialogue box and/or other NLI components.

Database 116 is a repository for data used by natural language component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within natural language environment 100, provided that natural language component 111 has access to database 116. Database 116 may store information associated with, but is not limited to, pre-define intent examples, pre-defined specific conversation component, previous stored mapping information between NLI components to a GUI component, information to help determine GUI code from a software source code and general mapping information for action calls and other GUI components.

In the depicted embodiment, natural language component 111 includes component mapping component 121, intent and entities component 122, action mapping component 123 and generation component 124.

As is further described herein below, component mapping component 121 of the present invention provides the capability of mapping GUI components to NLI components. For example (see FIG. 2C), upon receiving the GUI code representation of an app/website it will be parsed, every GUI components (e.g., buttons, dropdowns, radio buttons, charts, etc.) will be recognized by its declaration in the code and then mapped to the corresponding NLI component (e.g., dropdown selection will be mapped to a single choice input NLI component). It is noted that the GUI code representation can be derived (i.e., determined manually from the user or automatically) from the main source code of the software of the app/website.

Parsing the GUI code representation can involve extracting all relevant information for the NLI. All relevant information for the NLI can include, but it is not limited to, i) entities, ii) entity synonyms, iii) a mapping between the GUI components to NLI components, iv) actions (i.e., a button's onClick method) and v) any other information that could be relevant to the NLI.

As is further described herein below, intent and entities component 122 of the present invention provides the capability of creating intents/intent examples and entities. Intents/intent examples are purposes or goals that are expressed from the input, such as "report field" or "query value", system uses the pre-defined patterns and extracted examples from the GUI to train the NLU (Natural Language Understanding) to better identify these intents when input is received from the user.

Additionally, intent and entities component 122 of the present invention has the capability of creating new pre-defined patterns and/or editing existing pre-define patterns. Pre-defined patterns (i.e., like a template) are intent examples with placeholders for entities, these can be used to generate multiple intent examples. For example, if the system look at a pattern for "report" intent then this would occur:

"The value of {field-name} is {field-value}"

Figure 2A:
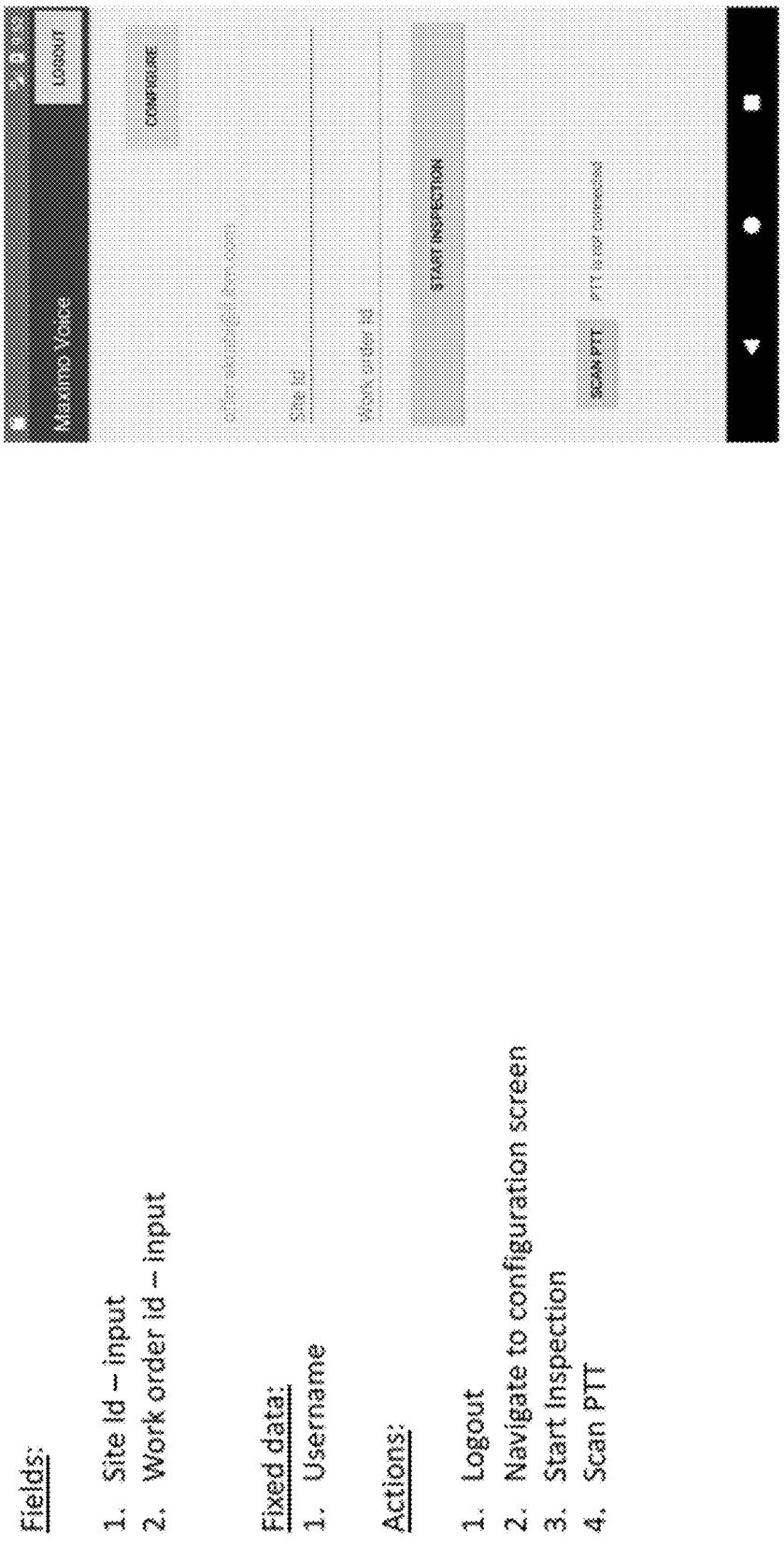
FIG. 2A is screenshot of a main screen of a sample application, in accordance with an embodiment of the present invention.

The system would create many intent examples from this pattern, substituting {field-name] and {field-value} with values that were automatically extracted from the code. In FIG. 2A "site id" and "work order id" are examples of {field-name} values, the {field-values} examples would have to be either defined or inferred from the code. For example, for "site id" the corresponding {field-value} could by "any numeric value". Users may edit existing pre-defined intent patterns based on the need of the application.

There are two options to determine these pre-defined patterns. The first option is to use a "package" of patterns that is already defined in the system (i.e., patterns for "report" intent which the system already has), the developer can add/remove patterns from this list. The package of patterns can be retrieved from a database (i.e., database 106) or can be retrieved from another server. The second option is for the developer can create his own list of patterns and intent. For example, embodiment can determine basic set of intent of patterns for the specific intent (i.e., "report" intent). Embodiment can either use the basic set of patterns or the developer can edit/modify existing basic pattern to suit the current extraction.

For every intent (i.e., "report" intent), there can be pre-defined entities (for "report" these would be "field" and "value"), only the training examples for these entities are extracted (e.g., for "value", it could be examples like "low", "high", etc.).

Figure 2C:
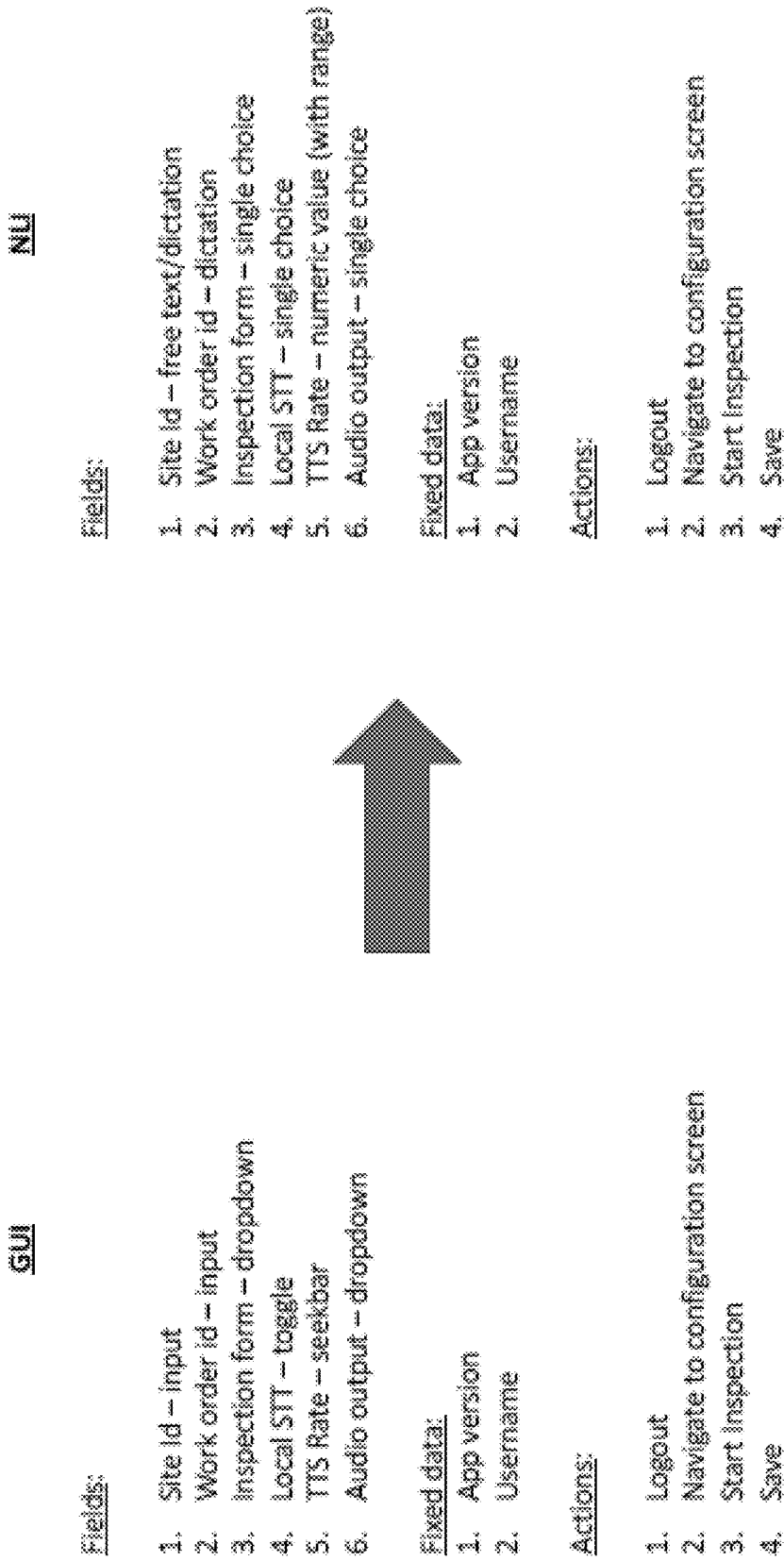
FIG. 2C is an example of illustrating GUI to NLI mapping for the sample application (from FIG. 2A), in accordance with an embodiment of the present invention.

Entities represent information in the user input that is relevant to the user's purpose, for example, when a user wants to report a field, the system needs to identify the intent ("report field") and which field the user wants to report (the entity). For example, "set oil level to low", in this example the intent would be "report value", the "field-name" entity would be "oil level" and the "field-value" entity would be "low". In FIG. 2C all the "Fields" and "Fixed data" are entities. In another example, "inspection form—single choice"—in this example the "field-name" entity is "inspection form" and the "field-value" entity will have values generated from the code (all possible answers from the original dropdown). The "single choice" part refers to the type of NLU component the GUI component is mapped to, in this case "dropdown" is mapped to "single choice".

In an alternative embodiment, intent and entities component 122 can leverage NLI components to be used as entities (i.e., single choice field NLI component will need a value entity). For these NLI component, embodiments can populate the necessary entities. The population process can be done in a similar way to the intents example extraction but it will take into account, the component type (i.e., closed single choice field NLI component will need a fixed list of possible values).

As is further described herein below, action mapping component 123 of the present invention provides the capability mapping action (e.g., extracting, callbacks, etc.). Actions mapping consists of mapping between calls to actions in the GUI code representation (e.g., button's "onClick" call back function) to a NL component's backend operations as part of action mapping. During the action mapping, action mapping component 123 can search and identify for any restrictions on the action (i.e., drop down component could have pre-defined allowed values) that will need to be taken into account in the NLI.

Actions mapping means that every callback or code extracted (that a GUI component had) will be referenced in the corresponding NLI component and will be used with the NLI component return value.

Additional functionality of action mapping component 123 includes construction pre-defined specific conversation component. Pre-defined specific conversation component are conversation building blocks (these are not seen by the user) which are used to construct the conversation. They can be viewed as the equivalent of the component classes in the GUI (e.g. the class for a drop-down menu). In order to construct the entire conversation blueprint, embodiment uses these generic blocks (e.g., "report single field" or "query field value").

As is further described herein below, generation component 124 of the present invention provides the capability of generating natural dialogue based on the results from component mapping component 121, intents and entities component 122 and action mapping component 123. Generation component 124 can use the NLI components, intents, entities and actions along with pre-defined domain specific conversation components to generate a natural language dialog file.

FIG. 2A is screenshot of a main screen of a sample application, in accordance with an embodiment of the present invention. A fictitious application (i.e., IBM® Maximo Inspection screen is used for illustrative purpose only and is not the actual screenshot of the embodiment) for a work order inspection system that has voice input and/or commands is shown. FIG. 2B is screenshot of a configuration screen of the fictitious application (from FIG. 2A), in accordance with an embodiment of the present invention.

FIG. 2C is an example of illustrating GUI to NLI mapping for the sample application (from FIG. 2A), in accordance with an embodiment of the present invention. FIG. 2C shows all the "Fields" and "Fixed data" as example of entities. Thus, "dropdown" is mapped to "single choice."

FIG. 2D is a sample of conversations and the corresponding logic, in accordance with an embodiment of the present invention. FIG. 2E is another sample of conversations and the corresponding logic, in accordance with an embodiment of the present invention. Both figures (2D and 2E) provides possible NLU/NLI dialogue representations of the fictitious application.

Figure 3:
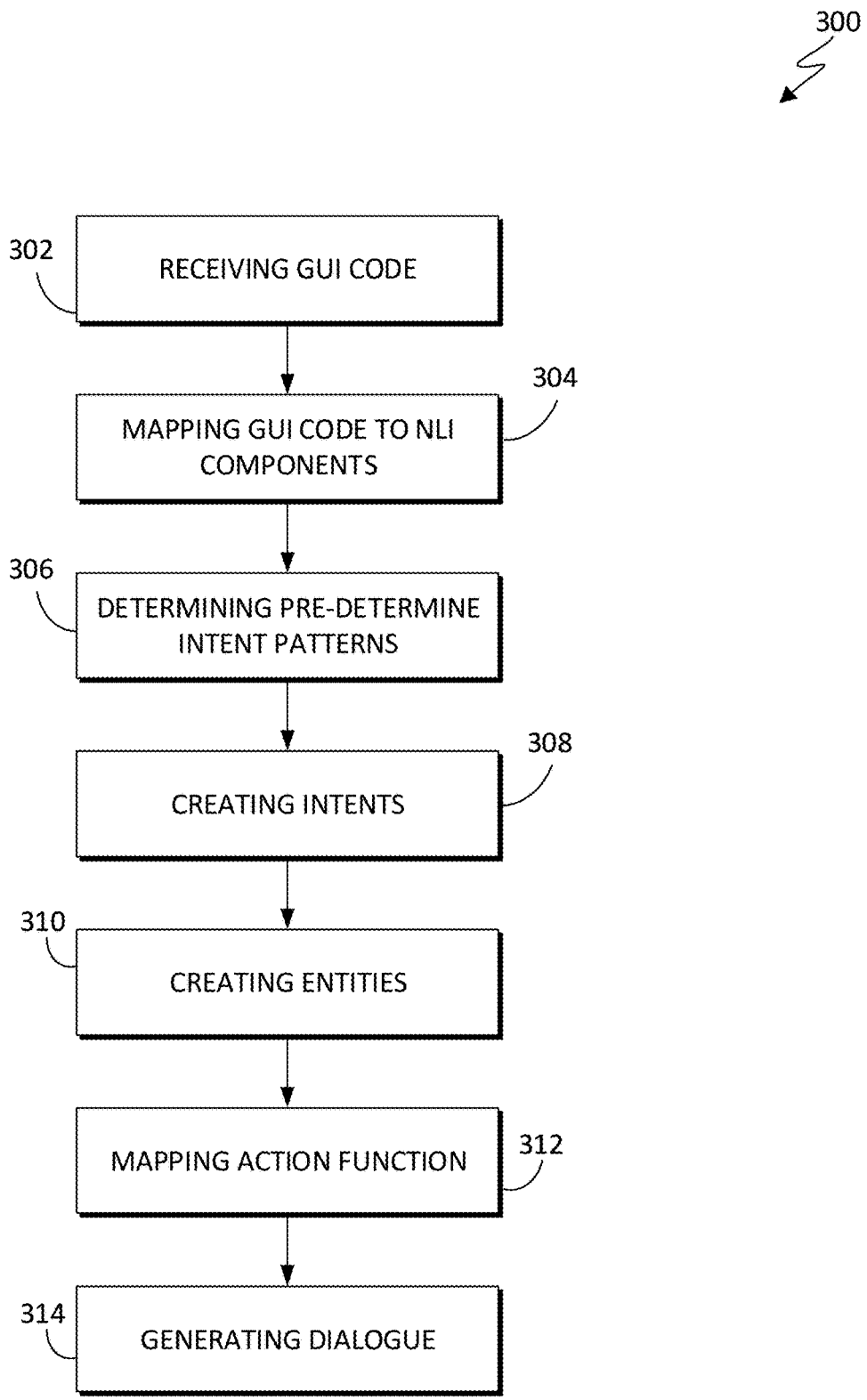
FIG. 3 is a high-level flowchart illustrating the operation of natural language component 111, designated as 300, in accordance with an embodiment of the present invention.

FIG. 3 is a flowchart illustrating the operation of natural language component 111, designated as 300, in accordance with another embodiment of the present invention.

Natural language component 111 receives GUI code representation (step 302). In an embodiment, natural language component 111, receives a GUI code representation of app/website that is to be parsed. For example, (referring to FIG. 2A), a sample application for a work order inspection will be used to illustrate the steps. Natural language component 111 retrieves the main source code of the work order inspection application. Natural language component 111 can determine the GUI code from the main source code of the app. Additionally, natural language component 111 can retrieve all relevant and necessary information (i.e., not related to the main source code) from the app to be analyzed.

Natural language component 111 maps the GUI code representation (step 304). In an embodiment, natural language component 111, through component mapping component 121, maps the GUI code representation to one or more NLI components. For example, every GUI components (e.g., buttons, dropdown, radio buttons, charts, etc.) will be recognized by its declaration in the code and then mapped to the corresponding NLI component (i.e., drop-down selection will be mapped to a single choice input NLI component).

Natural language component 111 determines pre-define intent patterns (step 306). In an embodiment, natural language component 111, through intent and entities component 122, determines pre-define intent patterns based on the one more NLI components.

Natural language component 111 creates intent examples (step 308). In an embodiment, natural language component 111, through intent and entities component 122, creating intent examples based on predefine intent patterns. For example, every NLI component has pre-defined intent which corresponds to it and pre-defined intent patterns. For every matched component, natural language component 111 extract from the GUI code, the corresponding labels, IDs, and names. Natural language component 111, through intent and entities component 122 (i.e., intent patterns), creates intent examples for the necessary intent. If the user wants to report a field, it can identify the intent as "report field" (from FIG. 2C).

Natural language component 111 creates entities (step 310). In an embodiment, natural language component 111, through intent and entities component 122, creates entities based the intent examples. Some of the NLI components will also use entities (i.e., single choice field NLI component will need a value entity). For those NLI components, embodiment needs to populate the necessary entities in a similar way to intent example extraction but will take into account the component type (i.e., closed single choice field NLI components will need a fixed list of possible values). For example, (referring to the previous step 308), based on the intent of "report field", the entities can be "fields" and "fixed data" (see FIG. 2C). In another example, still using "report" intent, there can be pre-defined entities such as "field" and "value". However, only the training examples for these entities are extracted (i.e., for "value" it could be examples like "low", "high", etc.).

Furthermore, natural language component 111, through action mapping component 123, can map actions of the GUI components (step 312). Every callback or code extract that the GUI component had will be referenced in the corresponding NLI component and will be used with the NLI component return value. Lastly, natural language component 111, through action mapping component 123, can create pre-defined specific conversation component. Pre-defined specific conversation component are the conversation building blocks (these are not seen by the user) which are used to construct the conversation. They can be seen as the equivalent of the component classes in the GUI (i.e., the class for a drop-down menu). In order to construct the entire conversation blueprint, embodiment use these generic blocks (e.g. "report single field" or "query field value").

Natural language component 111 generates a natural language dialogue (step 314). In an embodiment, natural language component 111, through generation component 124, generates a natural language dialogue based intents, entities, mapped actions and pre-defined specific conversation component. For example, (referring to FIGS. 2D and 2E) there are two possible generated dialogue boxes based on intents, examples, mapped actions and pre-defined specific conversation component.

Figure 4:
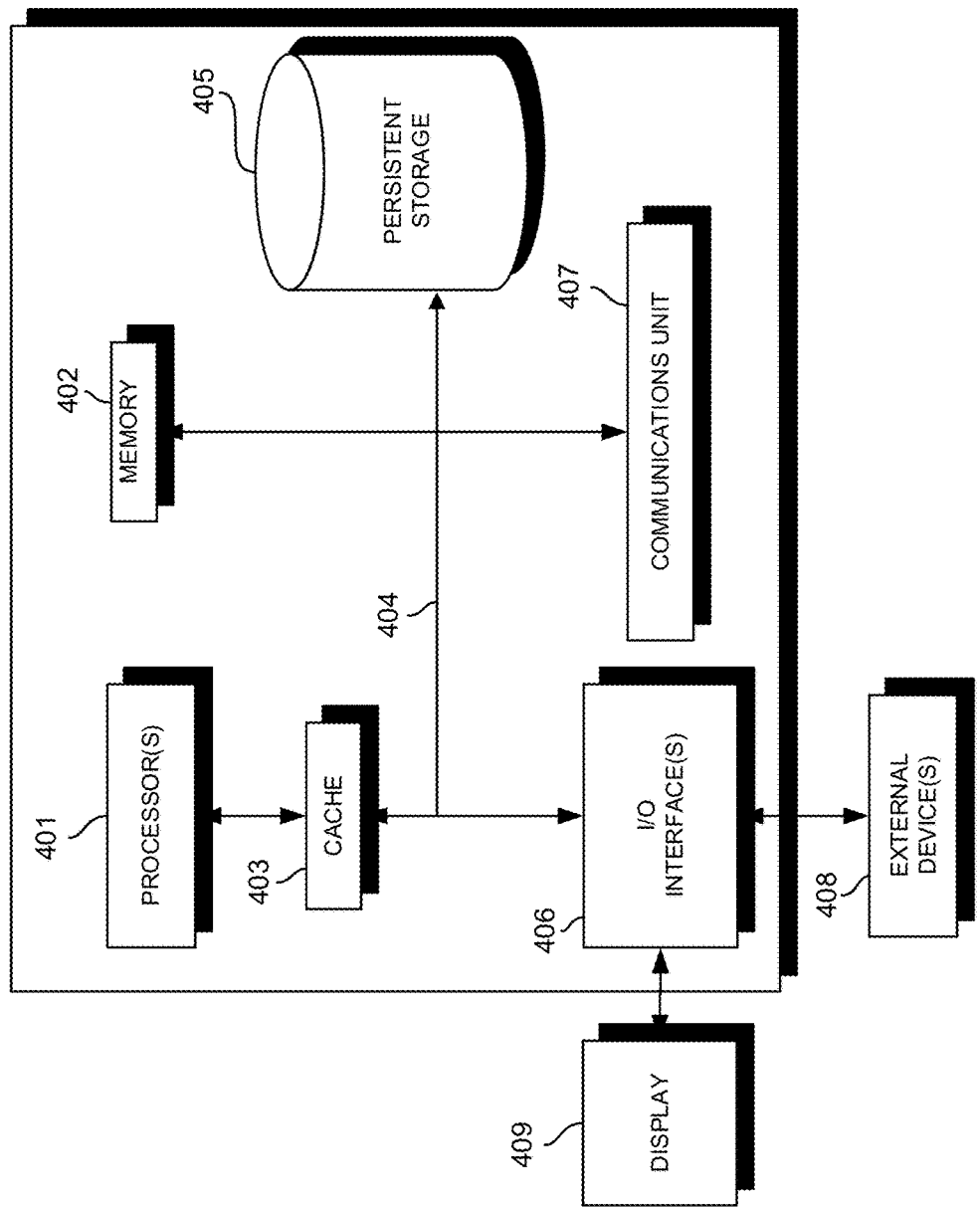
FIG. 4 depicts a block diagram, designated as 400, of components of a server computer capable of executing the natural language component 111 within the natural language environment, of FIG. 1, in accordance with an embodiment of the present invention.

FIG. 4, designated as 400, depicts a block diagram of components of natural language component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Natural language component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Natural language component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Natural language component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for creating a NL (Natural Language) dialogue from GUI (Graphical User Interface) code, the computer-method comprising:
    receiving GUI code representation of an application, wherein the GUI code representation is determined from a main source code of the application;
    mapping the GUI code representation to one or more NLI (natural language interface) components;
    determining a pre-define intent patterns based on the one more NLI components, wherein the pre-define intent patterns were created by a developer and the pre-define intent patterns are based on intents and wherein the intents are on based on names and ID of GUI component from the main source code;
    creating one or more intent examples based on the pre-define intent patterns;
    creating one or more entities based on the one or more intent examples;
    mapping action function to a backend operation of the one or more NLI components; and
    generating a NL dialogue based on the one or more intent examples, the one or more entities, mapped action function and pre-defined conversation component.

2. The computer-implemented method of claim 1, wherein receiving the GUI code representation of the application further comprising:
    identifying a source code of the application;
    retrieving relevant information from the application; and
    retrieving the GUI code from the source code of the application.

3. The computer-implemented method of claim 1, wherein mapping the GUI code representation to the one or more NLI components further comprising:
    determining one or more declarations of the GUI code; and
    associating the one or more declarations of the GUI code to the one or more NLI components.

4. The computer-implemented method of claim 1, wherein determining the pre-define intent patterns based on the one more NLI components further comprising:
    retrieving a package of patterns from a database; and
    modifying the package of patterns based on requirements of user.

5. The computer-implemented method of claim 1, wherein creating the one or more intent examples based on the predefine intent patterns further comprising:
    extracting the GUI code representation, corresponding labels, IDS and names for every matched NLI component; and
    generating the one or more intent examples based on the GUI code representation, the corresponding labels, the IDS and the names.

6. The computer-implemented method of claim 1, wherein creating the one or more entities based on the one or more intent examples further comprising:
    generating the one or more entities based on the one or more intent examples and a component type of the one or more intent examples.

7. The computer-implemented method of claim 1, wherein mapping action function to the backend operation of the one or more NLI components further comprising:
    identifying any restrictions on the one or more calls to action; and
    associating calls to actions from the GUI code to a backend NL component operation along with identified restrictions.

8. A computer program product for creating a NL (Natural Language) dialogue from GUI (Graphical User Interface) code, the computer program product comprising:
    one or more non-transitory computer readable storage media and program instructions stored on the one or more computer readable storage media, the program instructions comprising:
        program instructions to receive GUI code representation of an application, wherein the GUI code representation is determined from a main source code of the application;
        program instructions to map the GUI code representation to one or more NLI (natural language interface) components;
        program instructions to determine a pre-define intent patterns based on the one more NLI components;
        program instructions to create one or more intent examples based on the pre-define intent patterns, wherein the pre-define intent patterns were created by a developer and wherein the intents are on based on names and ID of GUI component from the main source code;

program instructions to create one or more entities based on the one or more intent examples;

program instructions to map action function to a backend operation of the one or more NLI components; and program instructions to generate a NL dialogue based on the one or more intent examples, the one or more entities, mapped action function and pre-defined conversation component.

9. The computer program product of claim 8, wherein receiving the GUI code representation of the application further comprising:

program instructions to identify a source code of the application;

program instructions to retrieve relevant information from the application; and program instructions to retrieve the GUI code from the source code of the application.

10. The computer program product of claim 8, wherein mapping the GUI code representation to the one or more NLI components further comprising:

program instructions to determine one or more declarations of the GUI code; and program instructions to associate the one or more declarations of the GUI code to the one or more NLI components.

11. The computer program product of claim 8, wherein determining the pre-define intent patterns based on the one more NLI components further comprising:

program instructions to retrieve a package of patterns from a database; and program instructions to modify the package of patterns based on requirements of user.

12. The computer program product of claim 8, wherein creating the one or more intent examples based on the predefine intent patterns further comprising:

program instructions to extract the GUI code representation, corresponding labels, IDS and names for every matched NLI component; and program instructions to generate the one or more intent examples based on the GUI code representation, the corresponding labels, the IDS and the names.

13. The computer program product of claim 8, wherein creating the one or more entities based on the one or more intent examples further comprising:

program instructions to generate the one or more entities based on the one or more intent examples and a component type of the one or more intent examples.

14. The computer program product of claim 8, wherein mapping action function to the backend operation of the one or more NLI components further comprising:

program instructions to identify any restrictions on the one or more calls to action; and program instructions to associate calls to actions from the GUI code to a backend NL component operation along with identified restrictions.

15. A computer system for creating a NL (Natural Language) dialogue from GUI (Graphical User Interface) code the computer system comprising:

one or more computer processors;
one or more computer readable storage media;

program instructions stored on the one or more computer readable storage media for execution by at least one of the one or more computer processors, the program instructions comprising:

program instructions to receive GUI code representation of an application, wherein the GUI code representation is determined from a main source code of the application;

program instructions to map the GUI code representation to one or more NLI (natural language interface) components;

program instructions to determine a pre-define intent patterns based on the one more NLI components;

program instructions to create one or more intent examples based on the pre-define intent patterns, wherein the pre-define intent patterns were created by a developer and wherein the intents are on based on names and ID of GUI component from the main source code;

program instructions to create one or more entities based on the one or more intent examples;

program instructions to map action function to a backend operation of the one or more NLI components; and program instructions to generate a NL dialogue based on the one or more intent examples, the one or more entities, mapped action function and pre-defined conversation component.

16. The computer system of claim 15, wherein receiving the GUI code representation of the application further comprising:

program instructions to identify a source code of the application;

program instructions to retrieve relevant information from the application; and program instructions to retrieve the GUI code from the source code of the application.

17. The computer system of claim 15, wherein mapping the GUI code representation to the one or more NLI components further comprising:

program instructions to determine one or more declarations of the GUI code; and program instructions to associate the one or more declarations of the GUI code to the one or more NLI components.

18. The computer system of claim 15, wherein determining the pre-define intent patterns based on the one more NLI components further comprising:

program instructions to retrieve a package of patterns from a database; and program instructions to modify the package of patterns based on requirements of user.

19. The computer system of claim 15, wherein creating the one or more intent examples based on the predefine intent patterns further comprising:

program instructions to extract the GUI code representation, corresponding labels, IDS and names for every matched NLI component; and program instructions to generate the one or more intent examples based on the GUI code representation, the corresponding labels, the IDS and the names.

20. The computer system of claim 15, wherein creating the one or more entities based on the one or more intent examples further comprising:

program instructions to generate the one or more entities based on the one or more intent examples and a component type of the one or more intent examples.

\* \* \* \* \*